United States Patent [19]
Dawson et al.

[11] Patent Number: 5,730,447
[45] Date of Patent: Mar. 24, 1998

[54] SELF-ALIGNING MAGNETIC ROTARY SEAL

[76] Inventors: Stephen M. Dawson, 18240 Wildlife Way Dr., Baton Rouge, La. 70817; Gary D. Anderson, 44614 Hwy. 42, Prairieville, La. 70769

[21] Appl. No.: 547,742

[22] Filed: Oct. 26, 1995

[51] Int. Cl.⁶ .................................................. F16J 15/34
[52] U.S. Cl. ........................................... 277/378; 277/390
[58] Field of Search ................................ 277/80, 38, 39, 277/81 R, 85, 173, 169, 83, 167.5

[56] References Cited

U.S. PATENT DOCUMENTS

| | | | |
|---|---|---|---|
| 2,690,360 | 9/1954 | Young | 277/167.5 |
| 3,014,742 | 12/1961 | Mayer | 277/85 |
| 3,050,319 | 8/1962 | Colby . | |
| 3,080,170 | 3/1963 | Colby . | |
| 3,919,004 | 11/1975 | Benz | 148/301 |
| 3,926,443 | 12/1975 | Fenerty et al. | 277/85 |
| 4,795,168 | 1/1989 | Adams et al. | 277/80 |
| 4,844,483 | 7/1989 | Iijima | 277/83 |
| 5,078,411 | 1/1992 | Geco | 277/80 |

FOREIGN PATENT DOCUMENTS

| | | | |
|---|---|---|---|
| 1404116 | 12/1965 | France | 277/167.5 |
| 191423 | 12/1983 | Japan | 277/80 |
| 1057728 | 11/1983 | U.S.S.R. | 277/173 |

Primary Examiner—Scott Cummings
Attorney, Agent, or Firm—Warner J. Delaune

[57] ABSTRACT

A magnetic rotary seal is provided for sealing a shaft to a housing, comprising a rotary seal head having a first annular surface; a first O-ring disposed between the rotary seal head and the shaft for sealably coupling the rotary seal head to the shaft; a housing adaptor disposed within the housing; a magnetic stationary ring disposed within the housing adaptor, wherein the stationary ring includes a second annular surface; a second O-ring disposed between the housing adaptor and the stationary ring for sealably coupling the stationary ring to the housing adaptor; and a plurality of magnets disposed within the rotary seal head for urging the first annular surface against the second annular surface. The second O-ring is held within opposing circumferential grooves formed in the housing adaptor and the stationary ring, which prevents the stationary ring from leaving the housing adaptor. The grooves are formed into the housing adaptor and the stationary ring such that a gap is created between the housing adaptor and the bottom surface of the stationary ring. During operation, the resiliency of the second O-ring and the presence of the gap allow the stationary ring to dynamically respond to any misalignment of the seal head while the opposing grooves serve to prevent the stationary ring from moving axially within the housing adaptor.

5 Claims, 2 Drawing Sheets

SELF-ALIGNING MAGNETIC ROTARY SEAL

BACKGROUND OF THE INVENTION

I. Field of the Invention

The present invention relates generally to rotary seals used in the protection of bearings, and more particularly to magnetic rotary seals having self-alignment capabilities.

II. Description of Prior Art

In numerous mechanical environments where rotating shafts are involved, it is often desirable to isolate the shaft bearings from external contaminants, such as metal filings, dust particles, and industrial fluids. Bearing protection of this type usually takes the form of a mechanical seal placed between the bearing housing and the shaft. Such seals generally employ either a flexible lip which sealingly contacts the circumference of the shaft, or an annular sealing interface between sliding seal elements. In the latter situation, much developmental effort has been focused on both labyrinth-type seals and magnetic-type seals, although it is the magnetic seal to which the present invention is directed.

While magnetic seals have generally proved versatile and reliable in most applications, all such seals must contend with the fact that it is impossible to create a perfect, leak-proof seal. The primary obstacles to creating the perfect seal are alignment difficulties, shaft eccentricities, vibration, and uneven frictional wear on interfacial seal elements. Modern manufacturing techniques have done much to minimize the deleterious effects of some of the above factors, but there will always be problems related to assembly techniques and vibration. For example, U.S. Pat. No. 5,078,411 issued to Geco is typical of many magnetic seals and will be used to illustrate some of the more common problems to be overcome by the present invention. In that device, a plurality of magnets are embedded within a rotating ring (or "seal head") which is sealingly attached to the shaft through the use of an O-ring. A sealing ring is mechanically coupled to the seal head and slidably contacts a mating stationary ring. The stationary ring is positioned within the shaft housing and is prevented from rotation therein by another O-ring. Thus, the bearings within the housing are protected from contamination by the double O-rings which secure the magnetic seal assembly between the shaft and the housing, as well as by the annular interface between the sealing ring and the stationary ring. As experience has shown, the success of this particular seal and other types of magnetic seals depends almost entirely upon the integrity of the annular interface. Consequently, the ultimate goal of most seal designers is to minimize the effects of misalignment and frictional wear at the interface. However, several phenomena make this extremely difficult to achieve.

During operation, shaft vibration and the resilient sealing connections between the seal head and the shaft may cause misalignment between the sealing ring and the stationary ring. It is generally believed that little can be done to remedy this effect, because the seal head must be allowed to move toward the stationary ring as the sealing ring becomes worn through continued use. An alternative but related problem is that the seal head tends to approach perpendicularity with the shaft by the effect of centrifugal forces exerted by the shaft rotation, especially at higher speeds. Thus, an apparently perfect alignment between the sealing ring and the stationary ring during installation of the seal may be lost during actual operation. The resulting misalignment causes extreme premature wear of the seal due to high point loads on the sealing ring.

Therefore, the prevailing practice in the prior art has been to firmly seat the stationary ring within the shaft housing, as seen in the Geco device, so that at least one of the interfacial surfaces is firmly fixed, in the hope that the sealing ring will adaptably align with the stationary ring. However, such alignment is still exceedingly difficult to establish in practice, because there is no clear reference point which would enable the technician to place the stationary face perpendicular with the axis of the shaft. Such difficulties are compounded when housing adaptors are used to secure the stationary ring because housing adaptors themselves are customarily press fit into the shaft housing. As will be appreciated, the forces imparted to the housing adaptor are transferred to the stationary ring, causing further misalignment.

The problem of misalignment of the stationary ring is also discussed in U.S. Pat. No. 4,795,168 issued to Adams, et al. (hereinafter "Adams"). According to that disclosure, the use of O-rings causes the stationary ring to assume a tilted or "out-of-square" position with respect to the housing or housing adaptor. Adams indicates that the cause of such tilting is due to the elastomeric distortion or roll of the O-ring during insertion, which leads to the interfacial misalignment problems well known to those in the field. Believing that the stationary ring should be firmly fixed in the housing, Adams discloses the use of a "seating ring" constructed of a hard, nonmagnetic material mounted in the housing so as to permit "direct and substantially rigid" mounting of the stationary ring. Unfortunately, the Adams seal encounters precisely the same practical problems as Geco, because any misalignment of the rotating sealing ring cannot be compensated for by the stationary ring.

After extensive consideration of the above disadvantages in rigidly fixing the stationary ring within the housing, it was realized that the leakage and wear problems could be resolved if the stationary ring were permitted to respond dynamically to the motion of the sealing ring. Therefore, contrary to the prior art devices which rigidly fix the position of the stationary ring, the present invention derives its advantages from allowing the stationary ring, whether within a housing adaptor or within the housing itself, to "float". By incorporating certain novel features which will be described in detail below, the stationary ring is permitted to tilt in response to the forces exerted by the sealing ring. Importantly, the dynamic responsiveness of the stationary ring is achieved while still maintaining the required sealing contact between the stationary ring and the housing. Furthermore, the requirement that the stationary ring be prevented from rotation within the housing is also maintained. Because of this self-alignment capability of the present invention, the problems of leakage at the interfacial surfaces and excessive or uneven wear are virtually eliminated, as will be explained below.

SUMMARY OF THE INVENTION

It is therefore an object of this invention to provide a magnetic rotary seal which includes self-alignment capabilities.

It is also an object of this invention to provide a magnetic rotary seal which minimizes leakage and wear problems associated with interfacial misalignment, thus increasing the cycle life of the seal.

It is a further object of this invention to provide a magnetic rotary seal which is simple and inexpensive to manufacture.

Yet another object of this invention is to provide a magnetic rotary seal which is reliable in operation for a wide variety of industrial applications.

These and other objects and advantages of the present invention will no doubt become apparent to those skilled in the art after having read the following description of the preferred embodiment which are contained in and illustrated by the various drawing figures.

Therefore, in a preferred embodiment, a magnetic rotary seal is provided for sealing a shaft to a housing, said seal comprising a rotary seal head having a first annular surface; first coupling means, such as an O-ring, disposed between said rotary seal head and said shaft for sealably coupling said rotary seal head to said shaft; a housing adaptor disposed within said housing, said housing adaptor having an axial recess and a first circumferential groove; a stationary ring disposed within said axial recess of said housing adaptor, said stationary ring having: (i) a second annular surface concentrically aligned with said first annular surface; (ii) a second circumferential groove, wherein said second circumferential groove is alignable with said first circumferential groove of said housing adaptor; and (iii) a bottom surface opposite said second annular surface; second coupling means, such as an O-ring, disposed within said first circumferential groove of said housing adaptor and said second circumferential groove of said stationary ring for sealably coupling said stationary ring to said housing adaptor; and magnetic means disposed between said rotary seal head and said stationary ring for urging said first annular surface against said second annular surface; wherein said first circumferential groove and said second circumferential groove are formed into said housing adaptor and said stationary ring, respectively, such that said bottom surface of said stationary ring is separated by a predetermined distance from said housing adaptor.

DETAILED DESCRIPTION OF THE PREFERRED EMBODIMENT

Figure 1:
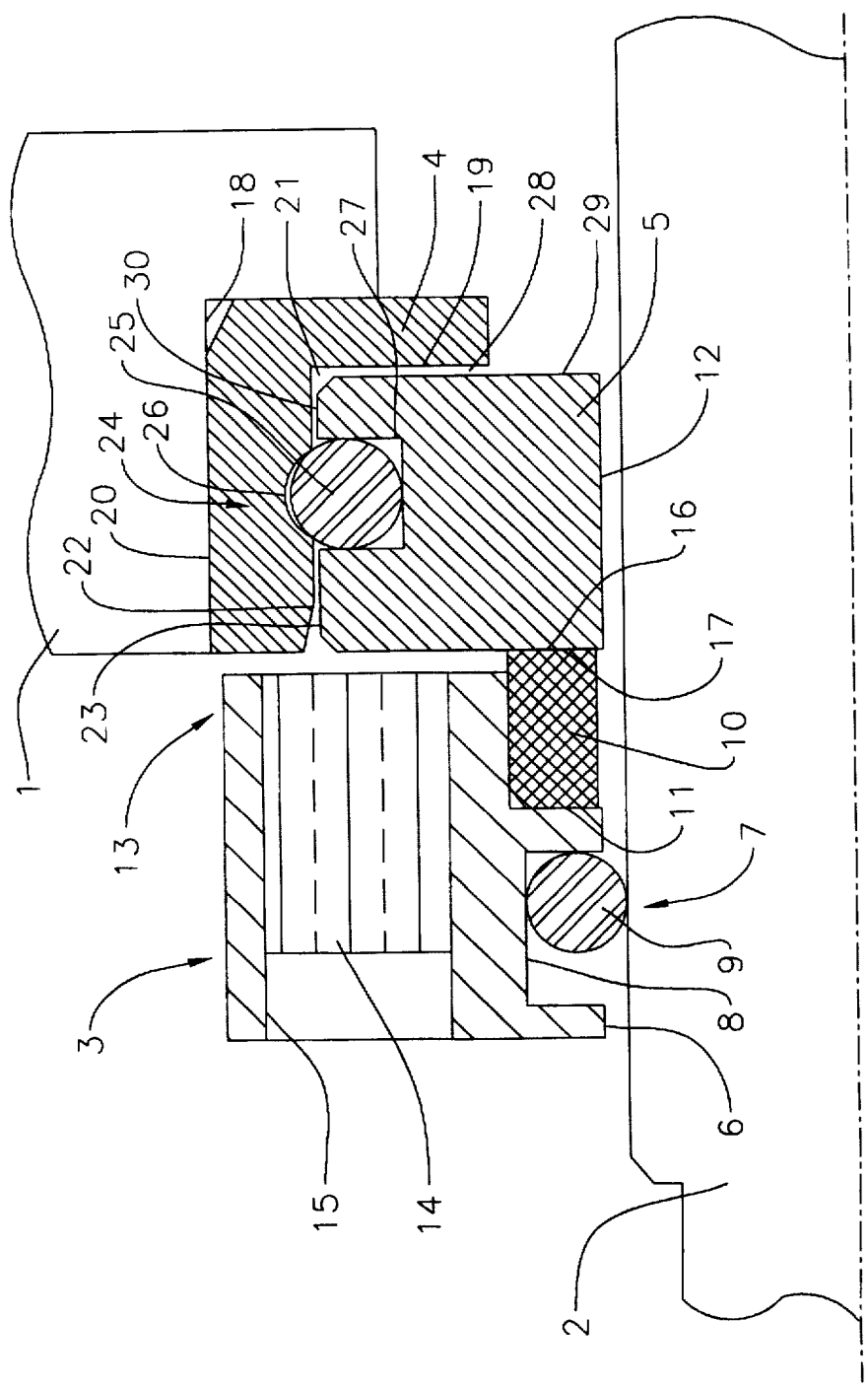
FIG. 1 is a cross-sectional elevation view of a preferred embodiment of the present invention.

In the drawings many details pertaining to fabrication and maintenance utility well established in the machine construction art and not bearing upon points of novelty are omitted in the interest of descriptive clarity and efficiency.

Turning now to FIG. 1, a cross-sectional view of a preferred embodiment is depicted. Housing 1 surrounds shaft 2, which is supported by bearings (not shown) in a pump, compressor or similar industrial machinery. The present invention generally comprises a rotary seal head 3, a housing adaptor 4, and a stationary ring 5. Both rotary seal head 3 and stationary ring 5 are formed in the shape of a ring having bores 6,12, respectively, slightly larger than the diameter of shaft 2. Rotary seal head 3 is preferably constructed from steel, such as any 300-series stainless steel, whereas housing adaptor 4 and stationary ring 5 are preferably constructed from a ferrous magnetic hardenable steel. Rotary seal head 3 is sealably coupled to shaft 2 by first coupling means 7, which is preferably the combination of groove 8 formed along the inner circumference of rotary seal head 3 and O-ring 9, preferably constructed of an elastomeric and chemically resistant material. As can be seen in FIG. 1, groove 8 should be wide enough to permit axial movement of rotary seal head 3 along shaft 2 to compensate for the gradual wear of sealing ring 10 over time.

Figure 2:
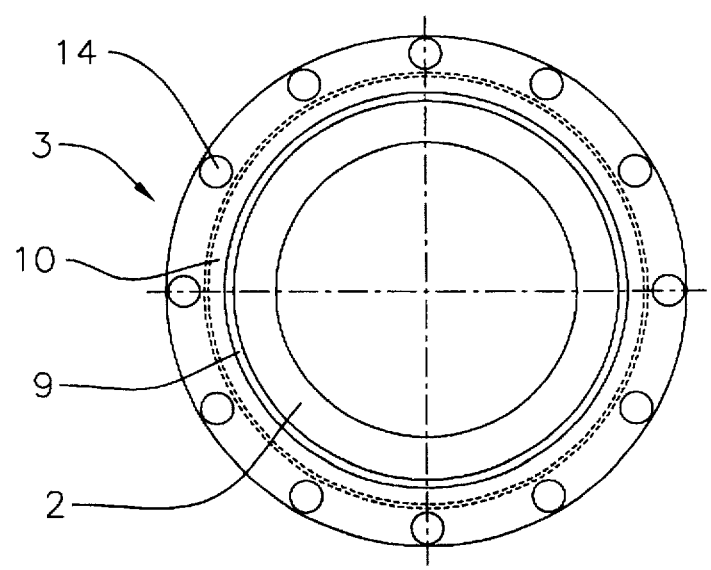
FIG. 2 is a front elevation view of the embodiment of FIG. 1, showing the positions of the plurality of magnets.

Sealing ring 10 is mechanically coupled to rotary seal head 3 in a concentric manner, such as by press fitting within recess 11, and may be constructed from a variety of suitable composite materials, such as tetrafluoroethylene (TFE) carbon graphite. If desired, rotary seal head 3 may also be constructed from the same material as sealing ring 10 such that rotary seal head 3 and sealing ring 10 are a single unit. Magnetic means 13 is disposed between rotary seal head 3 and stationary ring 5 for urging sealing ring 10 against stationary ring 5, and preferably comprises a plurality of magnets 14 permanently inserted within an equal number of holes 15 formed into rotary seal head 3, best shown in FIG. 2, and as disclosed in U.S. Pat. No. 5,078,411, the disclosure of which is incorporated herein by reference. Magnets 14 may be of any size and magnetic material, such as samarium cobalt, sufficient to maintain a sealing relationship between sealing ring 10 and stationary ring 5.

In order to create the intended sealing effect, sealing ring 10 includes a first annular surface 16 which is caused to rotatably slide against a concentrically aligned second annular surface 17 on stationary ring 5. Second annular surface 17 is preferably lapped or otherwise polished to a flat finish to avoid scratches to sealing ring 10 and to ensure maximum contact therewith.

For the purposes of retaining stationary ring 5, housing adaptor 4 is inserted within the bore 18 of housing 1, preferably by press fitting. Housing adaptor 4 includes a base 19 and a continuous side wall 20 which define an axial recess 21. Importantly, the diameter 22 of axial recess 21 is slightly larger than the outer surface 23 of stationary ring 5 so that there is no interference fit between housing adaptor 4 and stationary ring 5. Stationary ring 5 is retained within housing adaptor 4 by second coupling means 24. As shown in FIG. 1, second coupling means 24 preferably comprises an O-ring 25 positioned within a first circumferential groove 26 formed into the side wall 20 of housing adaptor 4 and a second circumferential groove 27 formed into the outer surface 23 of stationary ring 5. It can be seen that when O-ring 25 is seated within first and second circumferential grooves 26,27, the axial position of stationary ring 5 relative to housing adaptor 4 is fixed. To permit the self-alignment capabilities of the present invention, it is critical that first and second circumferential grooves 26,27 be formed at an axial location along housing adaptor 4 and stationary ring 5, respectively, such that a gap 28 is established between bottom surface 29 of stationary ring 5 and base 19 of housing adaptor 4. Generally speaking, the size of gap 28 is a predetermined distance based upon the size of the components, the dynamic characteristics of the mechanical environment, and the resiliency of the O-ring 25 material used. However, gap 28 should be large enough to permit tilting of stationary ring 5 within housing adaptor 4 without making metal-to-metal contact with housing adaptor 4. While not a requirement for practicing the invention, it is preferred that second circumferential groove 27 be deep enough to surround most of the cross-section of O-ring 25 as shown in FIG. 1, whereas first circumferential groove 26 should conform substantially to the exposed curvature of O-ring 25 which extends beyond outer surface 23. Optionally, the radius of first circumferential groove 26 could be made slightly smaller than the radius of O-ring 25 such that O-ring 25 and stationary ring 5 are maintained at a more fixed axial location as O-ring 25 is compressed by the edges of first circumferential groove 26.

By way of example only, and not by way of limitation, the following dimensions are provided as an illustration of the novel features of the present invention. For a shaft diameter of 2.375 inches and an O-ring 25 cross-sectional diameter of 3/32 inches, significant improvements over prior seal designs have been achieved using a gap 28 of approximately 0.005 inches and a clearance of about 0.005 inches between outer surface 23 and inner diameter 22 of housing adaptor 4. Based on field data generated through extensive testing, the Bearing Performance Improvement Rating (BPIR) is projected to be approximately 35,000 hours with an expected life of four years, compared to about 13,000 hours and below for other types of seals. As stated earlier, the self-alignment features of the present invention enable the interfacial frictional wear between first annular surface 16 and second annular surface 17 to be kept to a minimum, while concurrently providing virtually leak-proof operation. Thus, the possible applications for the invention are broader than most conventional seals, ranging from high-speed steam turbines to low-speed gear boxes. Furthermore, it is believed that there are no size limitations to successful application of the invention, because the self-alignment features may be incorporated through appropriately sized components as required.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. A magnetic rotary seal for sealing a shaft to a housing, said seal comprising:

(a) a rotary seal head having a first annular surface;

(b) first coupling means disposed between said rotary seal head and said shaft for sealably coupling said rotary seal head to said shaft;

(c) a housing adaptor disposed within said housing, said housing adaptor having an axial recess and a first circumferential groove;

(d) a stationary ring disposed within said axial recess of said housing adaptor, said stationary ring having:

(i) a second annular surface concentrically aligned with said first annular surface;

(ii) a second circumferential groove, wherein said second circumferential groove is alignable with said first circumferential groove of said housing adaptor; and (iii) a bottom surface opposite said second annular surface;

(e) second coupling means disposed within said first circumferential groove of said housing adaptor and said second circumferential groove of said stationary ring for sealably coupling said stationary ring to said housing adaptor; and (f) magnetic means disposed between said rotary seal head and said stationary ring for urging said first annular surface against said second annular surface;

wherein said first circumferential groove and said second circumferential groove are formed into said housing adaptor and said stationary ring, respectively, such that said bottom surface of said stationary ring is separated by a predetermined distance from said housing adaptor.

2. The magnetic rotary seal of claim 1, wherein said first and second coupling means are O-rings.

3. The magnetic rotary seal of claim 1, wherein said magnetic means comprises a plurality of magnets disposed circumferentially within said rotary seal head.

4. The magnetic rotary seal of claim 3, wherein said magnets are constructed from samarium cobalt.

5. The magnetic rotary seal of claim 1, wherein said first annular surface resides on a separate sealing ring attached to said rotary seal head.

\* \* \* \* \*